United States Patent
Melville

[11] Patent Number: 5,995,264
[45] Date of Patent: Nov. 30, 1999

[54] COUNTER BALANCED OPTICAL SCANNER

[75] Inventor: Charles D. Melville, Issaquah, Wash.

[73] Assignee: University of Washington, Seattle, Wash.

[21] Appl. No.: 09/009,465

[22] Filed: Jan. 20, 1998

[51] Int. Cl.[6] .................................................. G02B 26/08
[52] U.S. Cl. ..................... 359/198; 359/199; 359/201; 359/212; 359/213; 359/214; 359/224
[58] Field of Search .................................... 359/196–202, 359/212–214, 223–226, 900; 310/36, 40 R, 66

[56] References Cited

U.S. PATENT DOCUMENTS

| | | |
|---|---|---|
| 4,859,846 | 8/1989 | Burrer . |
| 4,902,083 | 2/1990 | Wells ...................................... 359/223 |
| 4,942,766 | 7/1990 | Greenwood et al. . |
| 5,121,138 | 6/1992 | Schermer et al. . |
| 5,164,848 | 11/1992 | Firth et al. . |
| 5,280,163 | 1/1994 | Barkan . |
| 5,280,377 | 1/1994 | Chandler et al. . |
| 5,467,104 | 11/1995 | Furness III et al. . |
| 5,557,444 | 9/1996 | Melville et al. . |
| 5,587,836 | 12/1996 | Takahashi et al. . |
| 5,596,339 | 1/1997 | Furness, III et al. . |
| 5,671,076 | 9/1997 | Matsubara et al. . |
| 5,694,237 | 12/1997 | Melville . |

Primary Examiner—James Phan
Attorney, Agent, or Firm—Steven P. Koda

[57] ABSTRACT

The scanner includes a first spring plate and a second spring plate of common size and shape symmetrically aligned and spaced. A first reflective surface is located at an end of first spring plate. A counter balance mass is located at a corresponding end of the second spring plate. The first spring plate and counter balance mass have common mass and volume and are symmetrically aligned about an axis of symmetry. During a drive cycle, the first spring plate and second spring plate are deflected equally in opposite directions. The first reflective surface and counter balance mass move equally in opposite directions causing the respective movement of the first reflective surface to be counter balanced by the movement of the counter balance mass. The motion is driven by electromagnetic circuits or piezoelectric circuits.

10 Claims, 6 Drawing Sheets

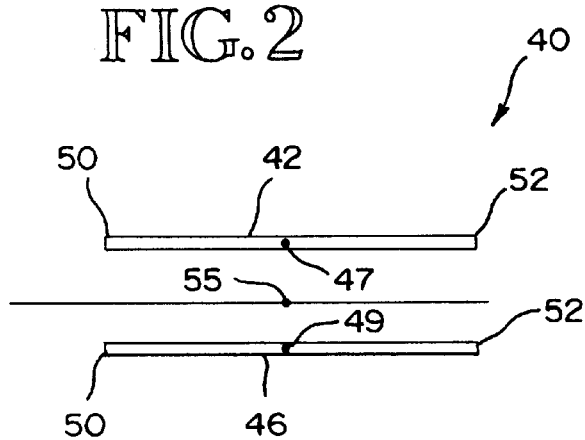
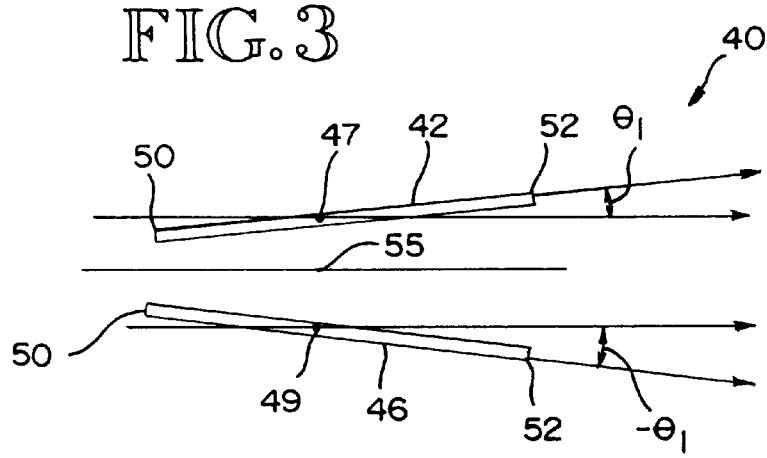
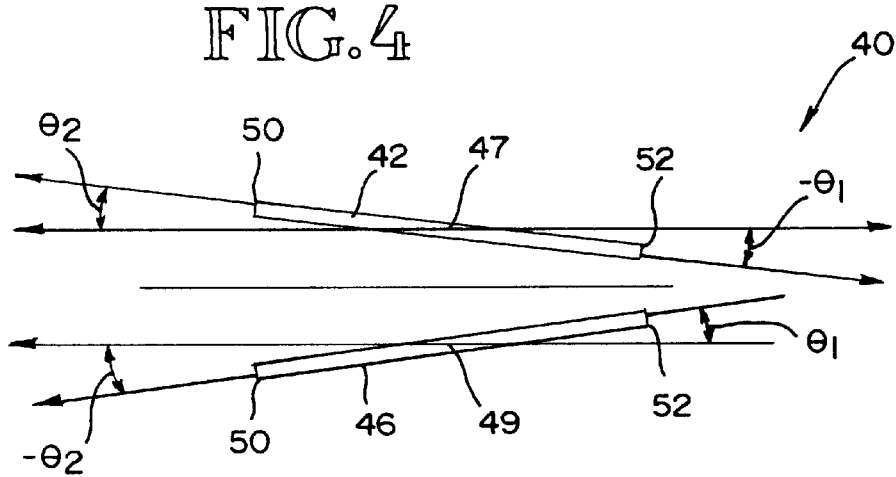

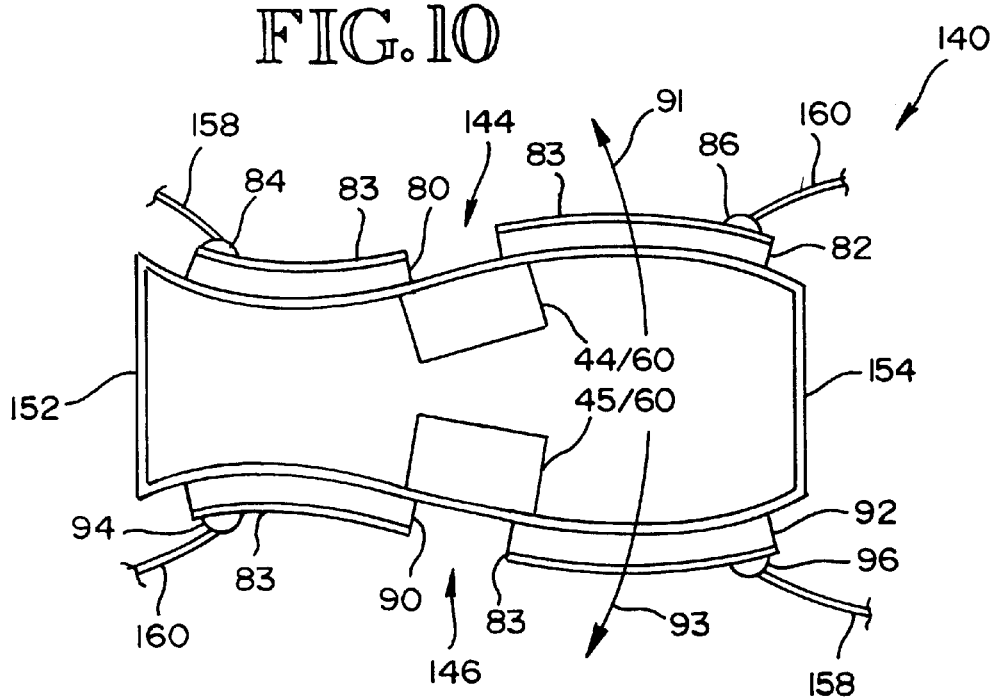
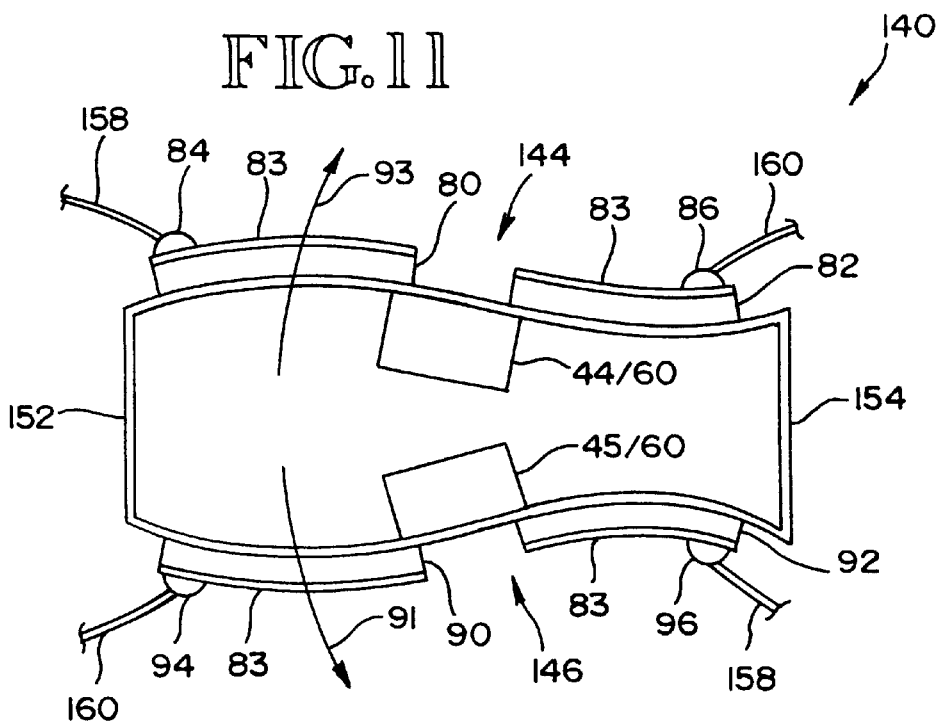

COUNTER BALANCED OPTICAL SCANNER

BACKGROUND OF THE INVENTION

This invention relates to optical scanner devices, and more particularly to a mechanical resonant scanner having a mirror which moves to deflect light along a scanning path.

Mechanical resonant scanners are used in retinal display devices to scan an image onto the retina of an eye. In an exemplary configuration one scanner is used to provide horizontal deflection of a light beam, while another scanner is used to provide vertical deflection of the light beam. Together the two scanners deflect the light beam along a raster pattern. By modulating the light beam and implementing multiple colors, a color image is scanned in raster format onto the retina.

Scanning rate and physical deflection distance characterize the movement of the scanner's mirror. In the context of a retinal display the scanning rate and deflection distances are defined to meet the limits of the human eye. For the eye to continually perceive an ongoing image the light beam rescans the image, or a changing image, in periodic fashion. Analogous to refreshing a pixel on a display screen, the eye's retinal receptors must receive light from the scanning light beam periodically. The minimum refresh rate is a function of the light adaptive ability of the eye, the image luminance, and the length of time the retinal receptors perceive luminance after light impinges. To achieve television quality imaging the refresh rate is to be at least 50 to 60 times per second (i.e., $\geq$50 Hz to 60 Hz). Further, to perceive continuous movement within an image the refresh rate is to be at least 30 Hz.

With regard to the deflection distance, the mirror is deflected to define a raster pattern within the eye. System magnification and distance between the scanner and an eyepiece determine the desired deflection distance. To define a raster pattern in which millions of bits of information (e.g., light pixels) are communicated onto a small area (i.e., eye retina), the position of the mirror is controlled to a high degree of accuracy. In a conventional mechanical resonant scanner, the mirror position is controlled by a magnetic circuit. The magnetic circuit typically includes a pair of permanent magnets and a pair of electromagnets.

FIG. 1 shows a conventional scanner 10 having a mirror 12 and a spring plate 14. The mirror 12 and spring plate 14 are the only moving parts. The scanner 10 also includes a base plate 16 having a pair of stator posts 18, 20. Stator coils 22, 24 are wound in opposite directions about the respective stator posts 18, 20. The coil windings are connected in series or in parallel to a drive circuit. On opposite ends of the base plate 16, permanent magnets 26, 28 are mounted. The magnets are equidistant from the posts 18, 20. The spring plate 14 has enlarged opposite ends 30 that rest on a pole of a respective permanent magnet. The magnets are oriented to have the same pole in contact with each end of the spring plate 14. Thus, the opposite pole of each magnet 26, 28 is located adjacent to the base plate 16. The spring plate 14, magnets 26, 28 and the base plate 16 are tightly clamped together by respective caps 34, 36.

Magnetic circuits are formed in the scanner 10 so as to oscillate the mirror 12 about an axis of rotation 15. A first magnetic circuit extends from the top pole of the magnet 26 to the spring plate end 30, through an arm of the spring plate and mirror 12 across a gap to the stator pole 18, then through the base plate 16 back to the permanent magnet 26. A second magnetic circuit extends a similar path but through the stator post 20 instead of the stator post 18. A third magnetic circuit extends from the top pole of the magnet 28 to the opposite spring plate end 30, through an arm of the spring plate and mirror 12 across a gap to the stator pole 18, then through the base plate 16 back to the permanent magnet 28. A fourth magnetic circuit extends a similar path but through the stator post 20 instead of the stator post 18. A periodic drive signal is applied to the oppositely wound coils 22, 24 creating magnetic fields which cause the mirror 12 to oscillate back and forth about the axis of rotation 15. A pair of frequency adjustment screws 37, 38 can be adjusted so as to increase or decrease the tension in the spring plate 14. Variation of such tension increases or decreases the resonant frequency of the scanner 10.

The oscillation of the mirror back and forth along its path produces reactive forces in the scanner. Such reactive forces cause other components of the scanner to vibrate. The vibration of the scanner in turn causes whatever is attached to the scanner to vibrate. For a head-mounted virtual retinal display device, the display device vibrates on the viewer's head. Because the whole scanner is moving, this vibration typically causes the mirror position also to be in error.

SUMMARY OF THE INVENTION

According to the invention, an optical scanner is counterbalanced so as to eliminate reactive forces. Specifically, a mass moves opposite the mirror of a retinal display to produce reactive forces of equal magnitude and opposite direction to those produced by the mirror. In some embodiments the mass is another mirror serving as a second scanner synchronized at 180 degrees out of phase to the first scanner.

According to one embodiment of the invention, the mirrors are driven by electromagnetic circuits. According to an alternative embodiment of the invention, the mirrors are driven by piezoelectric circuits.

According to one aspect of the invention a first spring plate and a second spring plate of common size and shape are symmetrically aligned and spaced. Each of the first spring plate and second spring plate has a first end and a second end. The respective second ends are symmetrically aligned. A first reflective surface is at the second end of first spring plate. A counter balance mass is at the second end of the second spring plate. The first spring plate and counter balance mass have common mass and volume and are symmetrically aligned about an axis of symmetry. During a drive cycle, the first spring plate and second spring plate are deflected equally in opposite directions. Thus, the first reflective surface and counter balance mass move equally in opposite directions causing the respective movement of the first reflective surface to be counter balanced by the movement of the counter balance mass.

According to another aspect of the invention, a permanent magnet separates the first spring plate and second spring plate at the respective first ends. An armature and coil separate the first spring plate and second spring plate at the respective second ends. A drive signal energizes the coil to generate a magnetic flux field through the first spring plate and second spring plate causing the first reflective surface and counter balance mass to move equally in opposite directions. The respective movement of the first reflective surface is counter balanced by the movement of the counter balance mass.

According to another aspect of the invention, the scanner includes first and second piezoelectric circuits instead of the permanent magnet, armature and coil. The piezoelectric circuits cause the first and second spring plates, and thus the first reflective surface and the counter balance mass equally in opposite directions. The respective movement of the first reflective surface is counter balanced by the movement of the counter balance mass.

One advantage of this invention is that reactive forces of the scanner are eliminated or at least substantially reduced. A benefit of this is that a head mounted display having such a scanner is more comfortable for the viewer to wear because vibrations are reduced. Reduced vibrations may result in more accurate scanning of the light beam during a scanning cycle. These and other aspects and advantages of the invention will be better understood by reference to the following detailed description taken in conjunction with thee accompanying drawings.

BRIEF DESCRIPTION OF THE DRAWINGS

FIG. 2 is a diagram of a mirror and counter balance mass at rest positions according to an embodiment of this invention;

FIG. 3 is a diagram of the mirror and counter balance mass at first extreme positions;

FIG. 4 is a diagram of the mirror and counter balance mass at second extreme positions;

FIG. 10 is a cross-sectional view of the scanner portion of FIG. 9 showing a first extreme position;

FIG. 11 is a cross-sectional view of the scanner portion of FIG. 10 showing a second extreme position.

DESCRIPTION OF SPECIFIC EMBODIMENTS

Counter Balancing Scanner Overview

Figure 1:
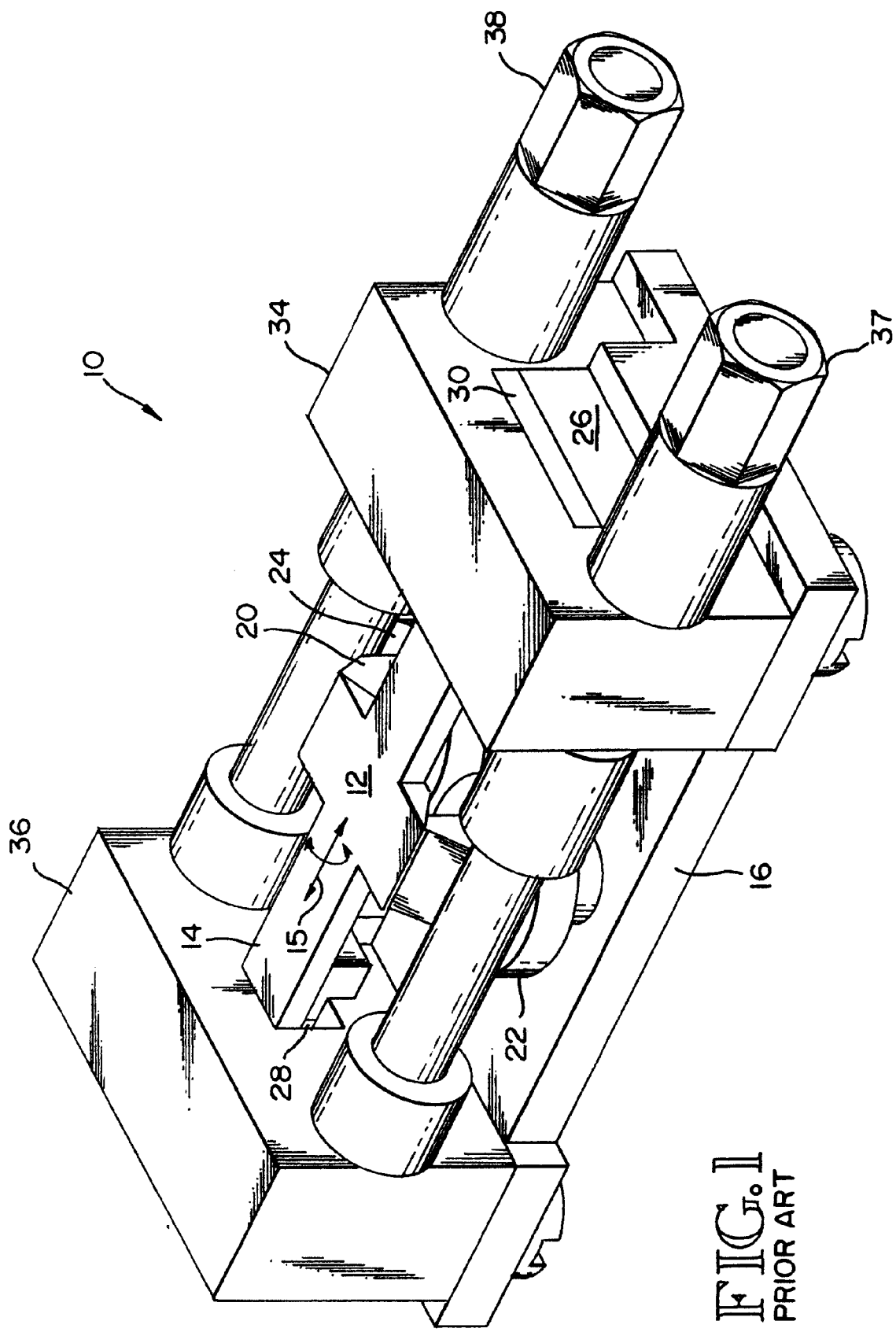
FIG. 1 is a perspective view of a conventional mechanical resonant scanner.

FIGS. 2–4 show a mirror 42 and counter balance mass 46 of a scanner 40. The mirror 42 and counter balance mass 46 oscillate about respective axes of rotation 47, 49. The mirror 42 moves back and forth between a first extreme angle ($\theta_1$) and a second extreme angle ($\theta_2=\theta_1$) The mass 46 also moves back and forth between a first extreme angle ($-\theta_1$) and a second extreme angle ($-\theta_2=\theta_1$). For a given drive cycle the mirror 44 and mass 46 are moved from respective initial orientations (see FIG. 2) to first extreme angles (See FIG. 3), then back through the initial orientation to second extreme angles, (see FIG. 3), then back again to the initial orientation. Continuing drive cycles result in oscillatory motion of the mirror 42 and mass 46. Note that the rotation of the mirror 42 occurs in the opposite direction of rotation of the mass 46. Each of the mirror 42 and mass 46 have a first edge 50 and a second edge 52. The mirror 42 and mass 46 each have the same volume and mass, and thus have the same rotational inertia. They are of the same dimensions and are symmetrically located at all times about an a plane of symmetry 55. As the mirror 42 and mass 46 rotate toward the first extreme angle (see FIG. 6), the second edge 52 of the mirror 42 is deflected by an angle ($\theta_1$) which is equal and opposite to the deflection of the second edge 52 of the mass 46. Similarly, the first edge 50 of the mirror 42 is deflected by an angle ($-\theta_1$) which is equal and opposite to the deflection of the first edge 50 of the mass 46. As the mirror 42 and mass 46 rotate toward the second extreme angle (see FIG. 7), the second edge 52 of the mirror 42 is deflected by an arc ($\theta_2$) which is equal and opposite to the deflection of the second edge 52 of the mass 46. Similarly, the first edge 50 of the mirror 42 is deflected by an angle ($-\theta_2$) which is equal and opposite to the deflection of the first edge 50 of the mass 46. Such equal and opposite motion of the mass 46 counter balances the forces imposed onto the rest of the scanner 40 by the motion of the mirror 42. The motion of the mirror 42 tends to induce vibration in the scanner. This vibration is a result of reactive forces. Such reactive forces cause other components of the scanner to vibrate. The vibration of the scanner in turn causes whatever is attached to the scanner to vibrate. For a headmounted virtual retinal display device, the display device vibrates on the viewer's head. Because the whole scanner is moving, this vibration typically causes the mirror position also to be in error. According to this invention, the motion of the mass 46 induces counter forces which offset the reactive forces, thus eliminating or at the least damping the reactive forces of the mirror. The net effect is less or no vibration induced into the rest of the retinal display.

By changing the deflection angle of the mirror 42 and mass 46 over time, light incident to the mirror 42 is deflected at varying angles. By repeating the changes in orientation in a cyclic manner the light is deflected across a scan path in a cyclic manner. In one implementation, the optical scanner 40 serves as a horizontal line scanner for a virtual retinal display. Each line of the display is generated by deflecting the light along a horizontal line scan.

Scanner Embodiment—Magnetic Drive

Figure 5:
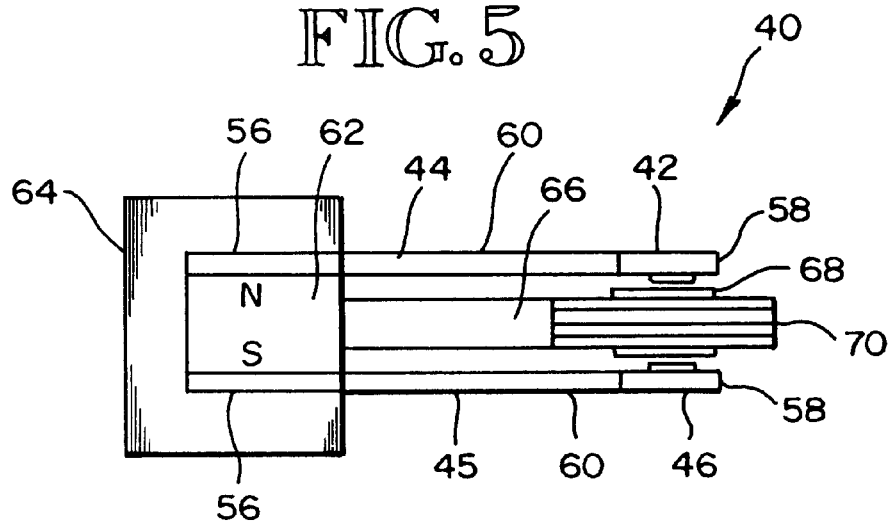
FIG. 5 is a side view of a mechanical resonant scanner according to an embodiment of this invention.
Figure 6:
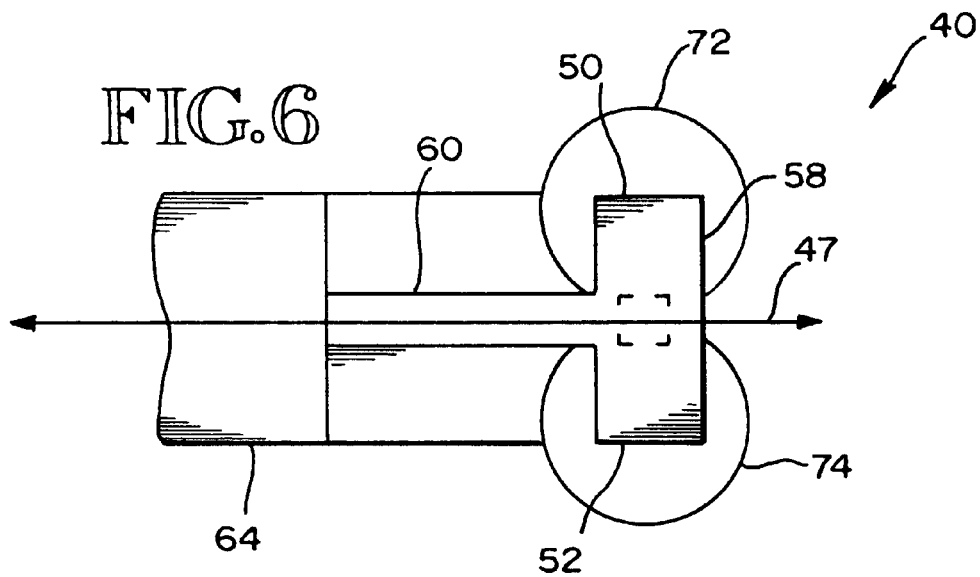
FIG. 6 is a top view of a mechanical resonant scanner of FIG. 5.
Figure 7:
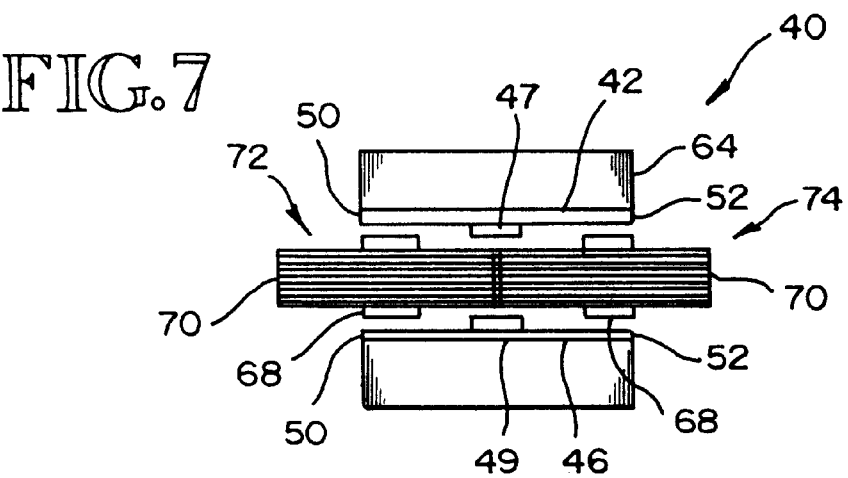
FIG. 7 is a front view of a mechanical resonant scanner of FIG. 5.

FIGS. 5–7 show a counter balanced optical scanner 40 according to an embodiment of this invention. The scanner 40 includes two arms, a mirror 42 and a counter balance 46. The arms are formed by spring plates 44, 45. The mirror 42 is formed integral to or separate from spring plate 44. The counter balance mass 46 is formed integral to or separate from spring plate 45. In one embodiment the mirror 42 is formed by a smooth, polished reflective surface area of the spring plate 44. In another embodiment the mirror 42 is a separate structure mounted to the spring plate 44. In one embodiment the counter balance mass 46 also is a mirror formed as a reflective surface or mounted to the spring plate 45. The scanner serves to deflect light incident to the mirror(s) 42, (46).

Each spring plate 44, 45 is of a common shape, volume and mass so that each has the same rotational inertia. The spring plates 44, 45 at all times are symmetrically positioned about the plane of symmetry 55 (see FIGS. 2–4). Each spring plate 44, 45 includes a first end 56, a second end 58 and an arm portion 60. In one embodiment the first end 56 and second end 58 are of the same shape and are symmetrically located about the arm portion 60. A permanent magnet 62 spaces the spring plates 44, 45. The permanent magnet 62 is positioned between the respective first ends 56 of the spring plates 44, 45. A scanner body or clamp 64 holds the first ends 56 steady against the permanent magnet 62. Extending from the clamp 64 is a coil holder 66 which supports a pair of electromagnetic coils 72, 74. Each coil 72, 74 is formed by an armature 68 and coil windings 70. The coils 72, 74 are located between the respective second ends 58 of the spring plates 44, 45. Thus, the coils 72, 74 are located between the mirror 42 and the mass 46. A gap occurs between the coils 72, 74 and the mirror 42. Similarly, a gap occurs between the coils 72, 74 and the mass 46. As shown in FIGS. 6 and 7, the coil 72 is located between the first edges 50 of the mirror 42 and mass 46. Similarly, the coil 74 is located between the second edges 52 of the mirror 42 and mass 46.

A dc magnetic flux field is formed by the permanent magnet 62. An ac magnetic flux field is formed by each coil 72, 74. The dc field originates in the permanent magnet 62, then flows through the first end 56, then arm portion 60, then second end 58 and mirror 42 of the spring plate 44, then across both upper gaps into both armatures 68, across both lower gaps, then through the mass 46 and the spring plate 45 back into the permanent magnet 62. The direction of flow depends on the pole orientation of the permanent magnet 62. One ac flux circuit is induced by the magnetic field created by the coil 72. A magnetic field is induced in the armature 68 of the coil 72. Magnetic flux flows across a gap from the armature 68 of coil 72 into the one edge 50 of the mirror 42, then through the mirror 42 to the other edge 52 and across the gap into the armature 68 of the other coil 74. From there, the flux goes through the armature 68 of coil 74 across the gap into the mass 46 at the edge 52, then across the mass 46 to the other edge 50 and across the gap back into the armature 68 of coil 72. The other ac flux circuit is similar but flows in the opposite direction. A magnetic field is induced in the armature 68 of the coil 74. Magnetic flux flows across a gap from the armature 68 of coil 74 into the one edge 52 of the mirror 42, then through the mirror 42 to the other edge 50 and across the gap into the armature 68 of the other coil 72. From there, the flux goes through the armature 68 of coil 72 across the gap into the mass 46 at the edge 50, then across the mass 46 to the other edge 52 and across the gap back into the armature 68 of coil 74.

When a periodic drive signal such as a square wave is applied to the oppositely wound coils 72, 74 the changing magnetic fields cause the mirror 42 to oscillate back and forth about the axis of rotation 47 and cause the mass 46 to similarly oscillate back and forth about the axis of rotation 49. The direction of movement of the mass 46 is opposite that of the mirror 42. The magnitude of movement is the same for each of the mirror 42 and the mass 46. Thus, the mass 46 counter balances the mirror 42 during the oscillatory motion. More particularly, when the square wave is high for example, the magnetic fields set up by the magnetic circuits through the armature 68 of coil 72 cause the ends 50 of each of the mirror 42 and mass 46 to be attracted to the armature 68. At the same time, the magnetic field created by the magnetic circuits extending through the armature of coil 74 cause the opposite ends 52 of the mirror 42 and mass 46 to be repulsed from the armature 68 of coil 74. Thus, the mirror 42 is caused to rotate about the axis of rotation 47 in one direction and the mass 46 is caused to rotate about the axis of rotation 49 in the other direction. When the square wave goes low, the magnetic field created by the armature 68 of coil 72 repulses the ends 50 of the mirror 42 and mass 46. At the same time, the armature 68 of coil 74 attracts the ends 52 of the mirror 42 and mass 46. Thus, the mirror 42 is caused to rotate about the axis of rotation 47 in a second direction one direction and the mass 46 is caused to rotate about the axis of rotation 49 in the other direction. A periodic square wave causes the mirror 42 to rotate in one direction then another in an oscillatory manner. Similarly the mass rotates in one direction then another in an oscillatory manner, such directions of rotation being opposite those of the mirror 42.

Scanner Embodiment—Piezoelectric Drive

Figure 8:
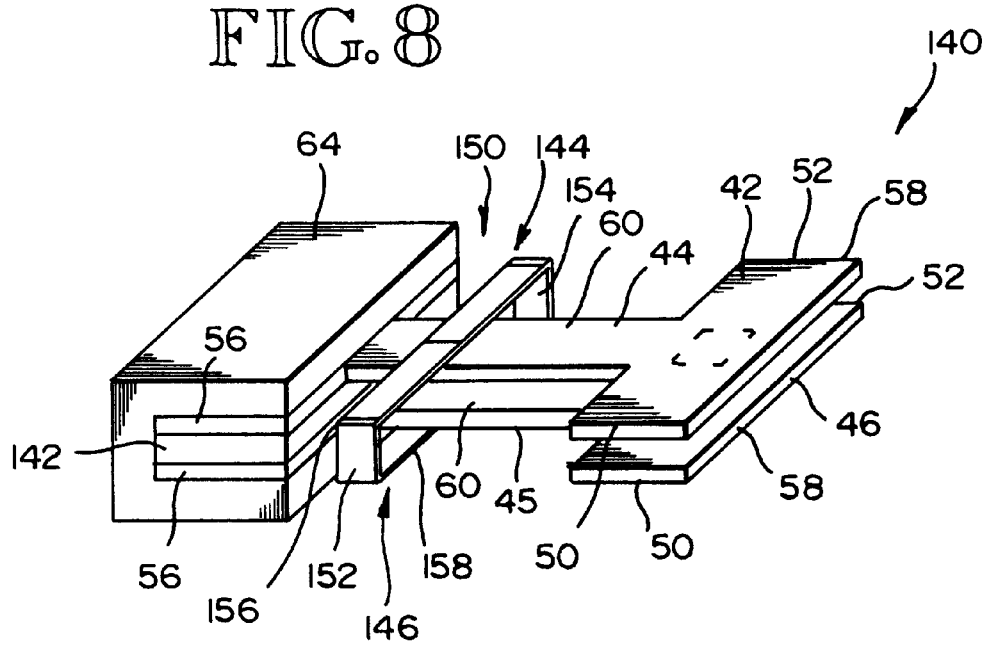
FIG. 8 is a perspective view of a mechanical resonant scanner according to another embodiment of this invention.
Figure 9:
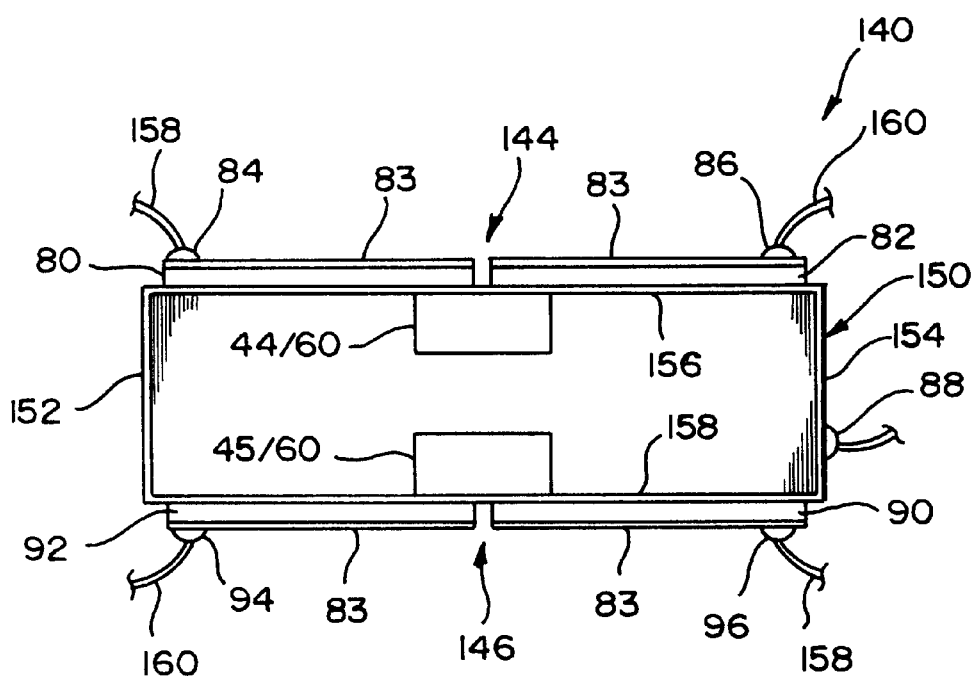
FIG. 9 is a cross-sectional view of a portion of the scanner of FIG. 8.

FIGS. 8-9 show a counter balanced optical scanner 140 according to an embodiment of this invention. Parts of scanner 140 performing the same function as corresponding parts of scanner 40 are given the same part numbers. The scanner 140 includes two arms, a mirror 42 and a counter balance mass 46. The arms are formed by respective spring plates 44, 45. The mirror 42 is formed integral to or separate from spring plate 44. The counter balance mass 46 is formed integral to or separate from spring plate 45. In one embodiment the mirror 42 is formed by a smooth, polished reflective surface area of the spring plate 44. In another embodiment the mirror 42 is a separate structure mounted to the spring plate 44. In one embodiment the counter balance mass 46 also is a mirror formed as a reflective surface or mounted to the spring plate 45. The scanner serves to deflect light incident to the mirror(s) 42, (46).

Each spring plate 44, 45 is of a common shape, volume and mass. The spring plates 44, 45 at all times are symmetrically positioned about the plane of symmetry 55 (see FIGS. 2–4). Each spring plate 44, 45 includes a first end 56, a second end 58 and an arm portion 60. In one embodiment the first end 56 and second end 58 are of the same shape and are symmetrically located about the arm portion 60. A spacer 142 spaces the spring plates 44, 45. The spacer 142 is positioned between the respective first ends 56 of the spring plates 44, 45. A clamp 64 holds the first ends 56 steady against the spacer 142 62.

The movement of the first spring plate 44 is driven by a first piezoelectric circuit 144. The movement of the second spring plate 45 is driven by a second piezoelectric circuit 146. A frame 150 is mounted to the spring plates 44, 45. In one embodiment the frame 150 is soldered to each spring plate 44, 45. In other embodiments, the frame 150 is screwed, adhered or otherwise attached to the spring plates 44, 45. The frame 150 includes two posts 152, 154 and a pair of cross beams 156, 158. The cross-beam 156 is centered over an arm portion 60 of first spring plate 44. The cross-beam 158 is centered over an arm portion 60 of other spring plate 45. In one embodiment the cross-beams are adhered to the respective arm portions 60 so as to mechanically couple any deflection of the cross-beam 156 to the spring plate 44 and of the cross-beam 158 to the spring plate 45.

Attached to cross-beam 156 are two piezoelectric volumes 80, 82. A metallization coating 83 covers each volume 80, 82. Although the volumes 80, 82 are shown above the cross-beam 156 and the spring plate arm 60 below the cross-beam 156, such relative positioning can vary. The first piezoelectric volume 80 receives a first drive signal 158 at a first contact 84. The second piezoelectric volume 82 receives a second drive signal 160 at a contact 86. The first and second drive signals are grounded by a ground connection to the frame at a ground contact 88. The piezoelectric volumes 80, 82 have the same volume. Such volume is constant during the operation of the scanner 140. When a piezoelectric volume 80/82 receives a drive signal of a first potential, the shape of the piezoelectric volume 80/82 changes to be shorter and fatter. When a piezoelectric volume 80/82 receives a drive signal of a second potential opposite the first potential, the shape of the piezoelectric volume 80/82 changes to be longer and thinner. It is by controlling the first and second drive signals that the rotation of the spring plate 44 is controlled.

Attached to cross-beam 158 also are two piezoelectric volumes 90, 92. The cross-beam metal and an adjacent piezoelectric volume form a structure referred to as a bimorph. A metallization coating 83 covers each volume 90, 92. Although the volumes 90, 92 are shown below the cross-beam 158 and the spring plate arm 60 above the cross-beam 158, such relative positioning can vary. The third piezoelectric volume 90 receives the first drive signal 158 at a third contact 96. The fourth piezoelectric volume 92 receives the second drive signal 160 at a contact 94. The piezoelectric volumes 90, 92 have the same volume. Such volume is constant during the operation of the scanner 140. When a piezoelectric volume 90/92 receives a drive signal of a first potential, the shape of the piezoelectric volume 90/92 changes to be shorter. This causes a concave deformation of the bimorphs formed by the respective cross-beams 158 and piezoelectric volumes 90/92. When a piezoelectric volume 90/92 receives a drive signal of a second potential opposite the first potential, the shape of the piezoelectric volume 90/92 changes to be longer. This causes a convex deformation of the bimorphs formed by the respective cross-beams 158 and piezoelectric volumes 90/92. It is by controlling the first and second drive signals that the rotation of the spring plate 45 is controlled.

In operation, when no drive signals are applied the spring plates 44, 45 are level relative to the plane of symmetry 55 (see FIG. 2). FIG. 9 shows a piezoelectric circuit at an initial rest position. By applying the first drive signal 158 to the piezoelectric volumes 80, 90, the volumes 80, 90 change shape in the same manner. Similarly, by applying the second drive signal 160 to the piezoelectric volumes 82, 92, the volumes 82, 92 change shape in the same manner. By having the first drive signal and second drive signal be of opposite polarity the shape of the piezoelectric volumes 80, 90 differs from that of the piezoelectric volumes 82, 92.

FIG. 10 shows the piezoelectric circuits 144, 146 and frame 150 in which the piezoelectric volumes 80, 90 get longer causing a convex deformation of the bimorphs including volumes 80, 90, while the piezoelectric volumes 82, 92 get shorter (relative to the initial shapes of FIG. 9) causing a concave deformation of the bimorphs including volumes 82, 92. Such deformation of the volumes 80, 82 cause the frame cross-beams 156, 158 to deflect (e.g., bow) in a manner which causes the spring plate 44 to rotate in a first direction 91 and the spring plate 45 to rotate in a second direction 93. After a prescribed time period, the polarity of the first drive signal and second drive signal are reversed. The spring plate 44 at a first extreme deflection moving in a first direction of rotation 91 now reverses direction into a second direction 93 of rotation. The piezoelectric volumes 80, 90, 82, 92 begin to changes shapes heading toward an opposite deformation. This causes the frame cross-beams 156, 158 to return to the initial positions of FIG. 9 and continue a deflection (e.g., bowing) as shown in FIG. 11 toward second extreme deflections. The spring plate 44 coupled to the cross-beam 156 moves through the initial position to a second extreme position. The spring plate 45 coupled to the cross-beam 158 also moves through the initial position to a second extreme position. FIG. 11 shows the piezoelectric volumes 80, 90 deformed to be shorter causing a concave deformation of the bimorphs including volumes 80, 90, while the second volumes 82, 92 get longer (relative to the initial shapes of FIG. 9) causing a convex deformation of the bimorphs including volumes 82, 92. Such deformation of the volumes 80, 82 causes the frame cross-beams 156, 158 to deflect (e.g., bow) in a manner which causes the spring plate 44 to rotate in the second direction 93 and the spring plate 45 to rotate in the first direction 91. Again the polarities of the first and second drive signal then are reversed bringing the cross-beams 156, 158 and spring plates 44, 45 back to and through the initial positions. Thus, FIG. 9 shows the piezoelectric circuits 144, 146 and frame 150 in the initial position. FIG. 10 shows the piezoelectric circuits 144, 146 and frame 150 moving the spring plates 44, 45 toward first extreme deflections. FIG. 11 shows the piezoelectric circuits 144, 146 and frame 150 moving the spring plates 44, 45 toward second extreme deflections opposite the first extreme deflection.

Retinal Display

Figure 12:
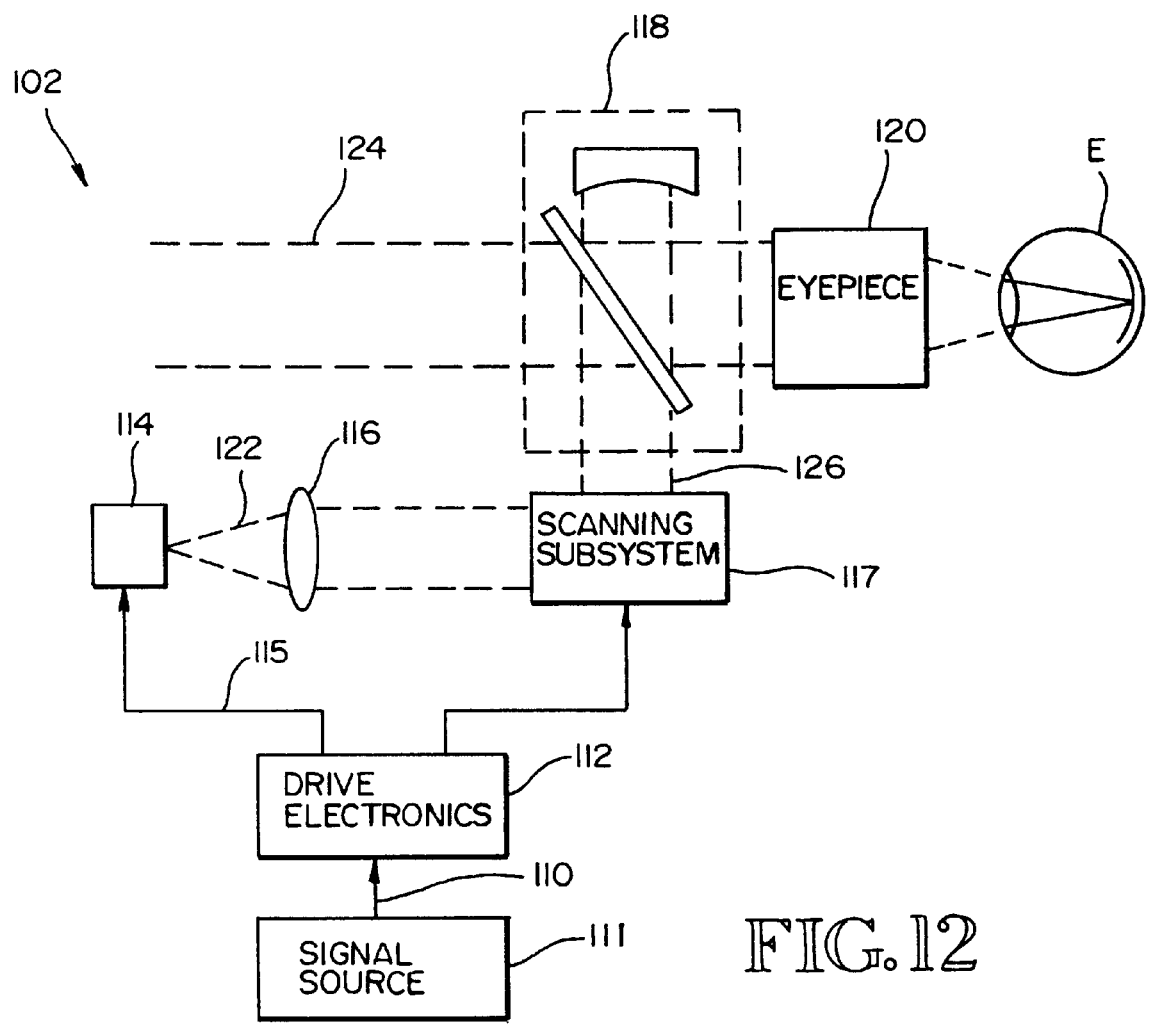
FIG. 12 is a diagram of a display apparatus hosting a scanner according to an embodiment of this invention.

FIG. 12 is a block diagram of a virtual retinal display 102 which generates and manipulates light to create color or monochrome virtual images having narrow to panoramic fields of view and low to high resolutions. The display 102 includes drive electronics 112, one or more light sources 114, a lensing or optics subsystem 116, and a scanning subsystem 117. In some embodiments the display 102 also includes a beamsplitter 118 and/or an eyepiece 120.

The display 102 receives an image signal 110 from an image source 111, such as a computer device, video device or other digital or analog image data source. The image signal 110 is an RGB signal, NTSC signal, VGA signal or other formatted color or monochrome video or image data signal. In an exemplary embodiment the drive electronics 111 extract color component signals and synchronization 'SYNCH' signals from the received image signal 110. In an embodiment in which an image signal 110 has embedded red, green and blue components, the red signal is extracted and routed to a modulator for modulating a red light point source output. Similarly, the green signal is extracted and routed to a modulator for modulating a green light point source output. Also, the blue signal is extracted and routed to a modulator for modulating a blue light point source output.

The light source 114 includes one or more point sources of light. For generating a monochrome image a single monochrome emitter typically is used. For color imaging, multiple light emitters (e.g., red light point source, green light point source, and blue light point source) are used. Preferably the emitted light is spatially coherent. Exemplary light emitters include colored lasers, laser diodes or light emitting diodes (LEDs). Although LEDs typically do not output coherent light, lenses are used in one embodiment to shrink the apparent size of the LED light source and achieve flatter wave fronts. In a preferred LED embodiment a single mode monofilament optical fiber receives the LED output to define a point source which outputs light approximating coherent light.

In one embodiment the light emitters are modulated based upon the signal(s) 115 received. In another embodiment the light emitters are externally modulated. For external modulation, the display device 102 includes a modulator responsive to the signal received from the drive electronics 111. The modulator modulates the visible light emitted by the light emitters to define image content for the virtual imagery scanned on a viewer's eye. The modulator is an acoustooptic, electrooptic, or micro-electromechanical modulator. Additional detail on these and other light source 114 embodiments are found in U.S. patent application Ser. No., 08/437,818 for "Virtual Retinal Display with Fiber Optic Point Source" filed May 9, 1995, and incorporated herein by reference. According to alternative embodiments, the light emitters or the light generated by the point sources are modulated to include red, green, and/or blue components at a given point (e.g., pixel) of a resulting image. Respective beams of the point sources are modulated to introduce color components at a given pixel. The light 122 output along an optical path thus is modulated according to image data within the image signal 110. Such modulation defines image elements or image pixels.

The optics subsystem 116 receives the light output from the light source 114, either directly or after passing through the scanning subsystem 117. In some embodiments the optical subsystem collimates the light. In another embodiment the optics subsystem converges the light. Left undisturbed the light converges to a focal point then diverges beyond such point. As the converging light is deflected, however, the focal point is deflected. The pattern of deflection defines a pattern of focal points. Such pattern is referred to as an intermediate image plane.

The emitted light is deflected along a prescribed pattern, such as a raster pattern, by the scanner subsystem 117. In an alternative embodiment another display format such as vector imaging can be used for scanning image elements onto the eye. In one embodiment the scanning subsystem 117 receives a horizontal deflection signal and a vertical deflection signal derived from the drive electronics 111. The scanning subsystem 117 is located after the light source 114, either before or after the optics subsystem 116. The scanning subsystem 117 includes a horizontal scanner and a vertical scanner. Either one or both of such scanners are embodied by the scanner 40 or scanner 140. In one embodiment, the scanning subsystem 117 includes the scanner 40/140 for performing horizontal beam deflection and a galvanometer for performing vertical beam deflection. The horizontal scanner receives a drive signal having a frequency defined by the horizontal synchronization signal extracted at the drive electronics 111. Similarly, the galvanometer serving as the vertical scanner receives a drive signal having a frequency defined by the vertical synchronization signal VSYNC extracted at the drive electronics 111. Preferably, the horizontal scanner has a resonant frequency corresponding to the horizontal scanning frequency. In an alternative embodiment, the scanning subsystem 117 includes the scanner 40/140 or acousto-optical deflectors, electro-optical deflectors, or rotating polygons to perform the vertical light deflection.

The scanning subsystem deflects the light along a raster pattern, or another prescribed pattern, toward the eye E, or as in the embodiment illustrated, toward a beamsplitter 118. The beamsplitter 118 is useful for an augmented display which passes both background light 124 and image light 126 to the viewer's eye E. An eyepiece 120 focuses the light onto the eye E. The image pixels scanned onto the viewer's eye define a virtual image. The virtual image is updated and rescanned periodically so that the viewer perceives a continuous image.

Meritorious and Advantageous Effects

One advantage of this invention is that reactive forces of the scanner are eliminated or at least substantially reduced. A benefit of this is that a head mounted display having such a scanner is more comfortable for the viewer to wear because vibrations are reduced. Reduced vibrations may result in more accurate scanning of the light beam during a scanning cycle.

Although a preferred embodiment of the invention has been illustrated and described, various alternatives, modifications and equivalents may be used. For example although only one torsional arm is described and illustrated for moving a mirror or counterbalance, in alternative embodiments the arm or spring plate may have two arms with the mirror or counterbalance located at a center position along the length of the arms. Therefore, the foregoing description should not be taken as limiting the scope of the inventions which are defined by the appended claims.

What is claimed is:

1. An optical scanner system, comprising:

a first spring plate and a second spring plate of common size and shape symmetrically aligned and spaced, each of the first spring plate and second spring plate having a first end and a second end;

a permanent magnet separating the first spring plate and second spring plate at the respective first ends;

an armature and coil separating the first spring plate and second spring plate at the respective second ends;

a first reflective surface at a first select location of first spring plate, the first reflective surface for deflecting light during movement of the first reflective surface;

a counter balance mass at a second select location of the second spring plate, the first spring plate and counter balance mass having common mass and volume and being symmetrically aligned about an axis of symmetry;

a drive signal which energizes the coil to generate a magnetic flux field through the first spring plate and second spring plate causing the first reflective surface and counter balance mass to move equally in opposite directions, wherein the respective movement of the first reflective surface is counter balanced by the movement of the counter balance mass.

2. The scanner system of claim 1, wherein the counter balance mass comprises a second reflective surface.

3. The scanner system of claim 1, further comprising:

a scanning signal source which generates the drive signal; and a scanner body to which the first spring plate and second spring plate are mounted.

4. An optical scanner system, comprising:

a first spring plate and a second spring plate of common size and shape symmetrically aligned and spaced, each of the first spring plate and second spring plate having a first end and a second end, wherein the respective second ends are symmetrically aligned;

a first reflective surface at a select first location on the first spring plate, the first reflective surface for deflecting light during movement of the first reflective surface;

a counter balance mass at a select second location on the second spring plate, the first spring plate and counter balance mass having common mass and volume and being symmetrically aligned about an axis of symmetry;

means for deflecting the first spring plate and second spring plate equally in opposite directions, wherein the first reflective surface and counter balance mass move equally in opposite directions causing the respective movement of the first reflective surface to be counter balanced by the movement of the counter balance mass.

5. The scanner system of claim 4, wherein the counter balance mass comprises a second reflective surface.

6. The scanner system of claim 4, further comprising:

a scanning signal source which generates a scanning signal; and a scanner body to which the first spring plate and second spring plate are mounted;

wherein the deflecting means comprises: (i) a first driver coupled to the first spring plate and configured to move the first spring plate through a predetermined angular range responsive to the scanning signal; and (ii) a second driver coupled to the second spring plate and configured to move the second spring plate relative to the scanner body.

7. A method for driving cyclic motion of an optical scanner having a first spring plate and a second spring plate of common size and shape symmetrically aligned and spaced, the first spring plate having a first reflective surface at a first select location on the first spring plate, the first reflective surface for deflecting light during movement of the first reflective surface, the second spring plate having a counter balance mass at a second select location on the second spring plate, the first spring plate and counter balance mass having common mass and volume and being symmetrically aligned about an axis of symmetry, the method comprising:

deflecting the first spring plate and second spring plate equally in opposite directions during a drive cycle, wherein the first reflective surface and counter balance mass move equally in opposite directions causing the respective movement of the first reflective surface to be counter balanced by the movement of the counter balance mass; and receiving light at the first reflective surface during the drive cycle, wherein the light is deflected along a scan path during the drive cycle.

8. The method of claim 7, wherein the step of deflecting comprises generating magnetic flux circuits to deflect the first spring plate and the second spring plate.

9. The method of claim 7, further comprising the step of driving a first piezoelectric circuit coupled to the first spring plate and driving a second piezoelectric circuit coupled to the second spring plate, wherein the first piezoelectric circuit causes deflection of the first spring plate and wherein the second piezoelectric circuit causes deflection of the second spring plate.

10. An optical scanner system, comprising:

a scanning signal source which generates a scanning signal;

a scanner body;

a first arm mounted to the scanner body and movable relative to the scanner body;

a first driver coupled to the first arm and configured to move the first arm through a predetermined angular range responsive to the scanning signal;

a mirror supported by the first arm;

a second arm mounted to the scanner body and movable relative to the scanner body;

a second driver coupled to the second arm and configured to move the second arm relative to the scanner body; and a counterbalance supported by the second arm;

wherein the first arm is a first spring plate and the second arm is a second spring plate, the first spring plate and the second spring plate of common size and shape symmetrically aligned and spaced, each of the first spring plate and second spring plate having a first end and a second end;

wherein the first driver comprises; (i) a permanent magnet separating the first spring plate and second spring plate at the respective first ends; (ii) an armature and coil separating the first spring plate and second spring plate at the respective second ends;

wherein the second driver comprises: (i) said permanent magnet separating the first spring plate and second spring plate at the respective first ends; (ii) said armature and coil separating the first spring plate and second spring plate at the respective second ends;

wherein the mirror comprises a first reflective surface at a first select location of the first spring plate, the first reflective surface for deflecting light during movement of the first reflective surface;

wherein the counterbalance comprises a counter balance mass at a second select location of the second spring plate, the first spring plate and counter balance mass having common mass and volume and being symmetrically aligned about an axis of symmetry; and wherein the scanning signal serves as a drive signal which energizes the coil to generate a magnetic flux field through the first spring plate and second spring plate causing the first reflective surface and counter balance mass to move equally in opposite directions, wherein the respective movement of the first reflective surface is counter balanced by the movement of the counter balance mass.

* * * * *